United States Patent
Jordan et al.

(10) Patent No.: US 6,962,657 B2
(45) Date of Patent: Nov. 8, 2005

(54) WATER TREATMENT SYSTEM

(75) Inventors: George Jordan, Chardon, OH (US); Christopher Hansen, Newbury, OH (US); Lisa Heiden, Chardon, OH (US)

(73) Assignee: Kinetico, Incorporated, Newbury, OH (US)

( * ) Notice: Subject to any disclaimer, the term of this patent is extended or adjusted under 35 U.S.C. 154(b) by 398 days.

(21) Appl. No.: 10/033,355

(22) Filed: Nov. 1, 2001

(65) Prior Publication Data

US 2002/0084226 A1 Jul. 4, 2002

Related U.S. Application Data

(60) Provisional application No. 60/244,996, filed on Nov. 1, 2000.

(51) Int. Cl.[7] ............................................. B01D 24/46
(52) U.S. Cl. ..................................... 210/191; 422/902
(58) Field of Search ................................ 210/190, 191; 422/261, 902

(56) References Cited

U.S. PATENT DOCUMENTS

| | | | |
|---|---|---|---|
| 3,351,550 A | 11/1967 | Kraiker, Jr. .................. | 210/677 |
| 3,574,559 A * | 4/1971 | Kryzer et al. ............... | 422/106 |
| 3,684,457 A | 8/1972 | Pinto et al. .................. | 422/274 |
| 3,762,550 A | 10/1973 | Jarr et al. .................... | 210/126 |
| 3,891,552 A | 6/1975 | Prior et al. ................... | 210/88 |
| 4,336,134 A | 6/1982 | Prior ........................... | 210/127 |
| 4,337,153 A | 6/1982 | Prior ........................... | 210/288 |
| 4,374,025 A | 2/1983 | Loke ........................... | 210/140 |
| 4,764,280 A | 8/1988 | Brown et al. ............... | 210/662 |
| 4,889,623 A | 12/1989 | Prior et al. .................. | 210/190 |
| 5,045,187 A | 9/1991 | Suchanek ..................... | 210/91 |
| 5,106,543 A | 4/1992 | Dodds ........................ | 261/36.1 |
| 5,407,574 A | 4/1995 | Hensley ...................... | 210/269 |
| 5,544,072 A | 8/1996 | Zimmerman et al. ....... | 700/265 |
| 5,589,058 A | 12/1996 | Bauer .......................... | 210/98 |
| 5,685,975 A | 11/1997 | Joubert et al. .............. | 210/136 |

FOREIGN PATENT DOCUMENTS

SU 1369786 1/1988

* cited by examiner

Primary Examiner—Ivars C. Cintins
(74) Attorney, Agent, or Firm—Watts Hoffman Co., L.P.A.

(57) ABSTRACT

A water treatment system for removing hard ions from source water. The water treatment system is of the type that includes a pair of ion-exchange water softener tanks connectable to a source of pressurized water and with a water system to supply softened water to the water system, the tanks each being capable of regeneration by flushing with a regeneration solution to replenish depleted ions. A process for preventing system failure due to salt crystallization includes flowing water during brine replenishment from a second nozzle and a first nozzle at a defined ratio. The first nozzle diluted the brine in a reservoir after regeneration cycle is complete. The second nozzle replenishes brine by flowing water directly onto a salt material.

8 Claims, 3 Drawing Sheets

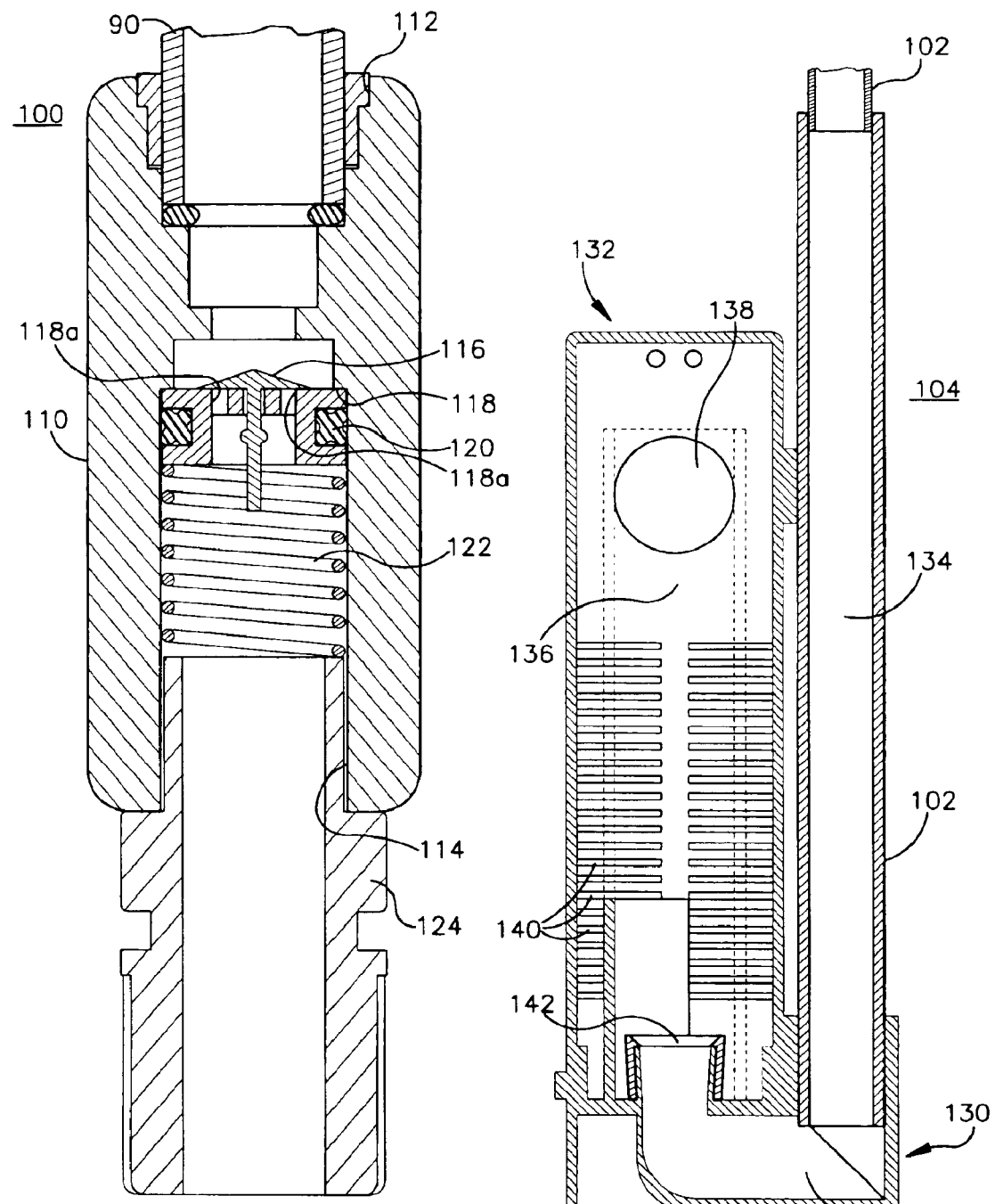

WATER TREATMENT SYSTEM

This application claims the benefit of U.S. Provisional Application No. 60/244,996, filed Nov. 1, 2000.

FIELD OF INVENTION

The present invention relates to a water treatment system. More specifically, the present invention relates to an improved brine valve and use thereof in a water treatment system.

BACKGROUND OF THE INVENTION

Household water softeners of the "ion exchange" type typically include a resin tank through which hard water passes to exchange its "hard" ions of calcium and magnesium for "soft" sodium or potassium ions from the resin bed. Regeneration of the resin bed is periodically required to remove the accumulation of hard ions and replenish the supply of soft ions. Regeneration is effected by flushing a solution of salt, i.e., a brine solution through the resin bed.

A separate brine tank is conventionally used to form the brine solution for use during the regeneration cycle. When regeneration is initiated in the softener system, the brine solution drawn from the brine tank passes through the bed of ion exchange material in the softener tank to reverse the exchange of ions and revitalize the bed by removing hardness inducing ions and replacing them with sodium or potassium ions from the brine. The regeneration cycle typically lasts about an hour and needs to be done, on average, about three or four times each week. More frequent regenerations are required in periods of greater than normal water usage. No regeneration is required when water usage ceases as typically happens when the occupants of a household go on a holiday or vacation. The cost of operating a water softener system may be reduced by limiting the amount of salt utilized in each regeneration cycle and the frequency of regeneration cycles to only that necessary to regenerate resin particles. Consequently, it is preferred that the brine solution have a concentration near its saturation point to minimize the amounts used for each regeneration cycle. Saturated solutions are less desirable since the salt in these solutions have a tendency to crystallize.

Most present day water softeners use a single resin tank for softening and are provided with automatic controls to regenerate the softening tank at periodic intervals. A drum containing a brine solution is typically connected to the resin tank and includes a concentrated aqueous solution of sodium chloride or potassium chloride. As previously discussed, the concentration of sodium chloride or potassium chloride is below the saturation point for the solution. However, the solubility characteristics for sodium chloride and potassium chloride are significantly different.

One problem addressed by the present invention is the difference in solubility behavior between various salts used as softeners, e.g., potassium chloride and sodium chloride. Sodium chloride solubility is less sensitive to temperature fluctuations than potassium chloride solubility. For example, at 0° C. the solubility of sodium chloride in water is about 35.7 grams per cubic centimeter (g/cc) of saturated solution whereas potassium chloride is about 27.6 g/cc. Increasing the temperature to 10° C. increases the solubility of a saturated sodium chloride solution to 35.8 g/cc and a saturated potassium chloride solution to 31.0 g/cc. Further incremental increases to 20° C. and 30° C. increase solubility of a saturated sodium chloride solution to 36.0 g/cc and 36.3 g/cc, respectively, whereas the solubility of a saturated potassium chloride solution increases to 34.0 g/cc and 37.0 g/cc, respectively. Clearly, the solubility of sodium chloride solutions are less sensitive to temperature fluctuations. Conversely, the solubility of potassium chloride solutions at different temperatures varies greatly.

It is important to note that water softener systems are not always operated in controlled environments. The temperatures that household water softeners are exposed can vary significantly. The changes in temperature fluctuations can have a catastrophic effect on potassium chloride brine solutions. Since, it is desirable to have highly concentrated brine solutions below the saturation levels, the changes from higher to lower temperatures can cause re-crystallization of the dissolved potassium chloride. Once initial re-crystallization occurs, crystallization continues and tends to displace the brining solution. As a result, the remaining brine solution cannot be drawn into the resin beds for regeneration of the resin beds causing system failure.

The present invention addresses this problem and provides for a process and apparatus for reducing the formation of salt crystals in the brine solution.

SUMMARY OF THE INVENTION

The present invention when embodied in a water softening system provides a new and improved brine valve in which system failure is prevented as a result of crystal formation of brine.

The brine valve controls the supply of brine to a conditioning tank during a regeneration cycle and the supply of water to the brine tank at the end of the regeneration cycle The brine valve of the present invention includes a conduit in communication with the conditioning tank; means for withdrawing brine from a reservoir including a passageway in communication with the brine; and means for supplying water to the brine tank wherein the brine tank includes a brine well in communication with a brine reservoir, the means for supplying water including a first nozzle and a second nozzle in communication with the supply of water, the first nozzle supplying water to the brine well for diluting the brine in the reservoir after the regeneration cycle, the second nozzle supplying water to a salt material disposed over the reservoir for replenishing brine in the reservoir, the ratio of a flow of water from the second nozzle to the first nozzle is at about 8:1 to about 4:1. More preferably, the ratio of the flow rates of the second nozzle to the first nozzle is from about 6:1.

Another embodiment of the present invention is directed to an improved check valve in the brine valve assembly. The check valve provides means for withdrawing brine from a reservoir. The check valve includes a flexible membrane, a piston and a spring operatively connected wherein the supply of water causes the flexible membrane to flex and exert a pressure pulse on a volume of liquid in the second conduit whereby the volume of liquid displaces a float from a seat in the air check Other embodiments of the invention are contemplated to provide particular features and structural variants of the basic elements. The specific embodiments referred to as well as possible variations and the various features and advantages of the invention will become better understood when considered in connection with the detailed description that follows.

BRIEF DESCRIPTION OF THE DRAWINGS

FIG. 3 is cross sectional view of a check valve used in the construction of the brine valve assembly; and FIG. 4 is a cross sectional view of an air check used in the construction of the brine valve assembly.

DETAILED DESCRIPTION OF THE PREFERRED EMBODIMENTS

Figure 1:
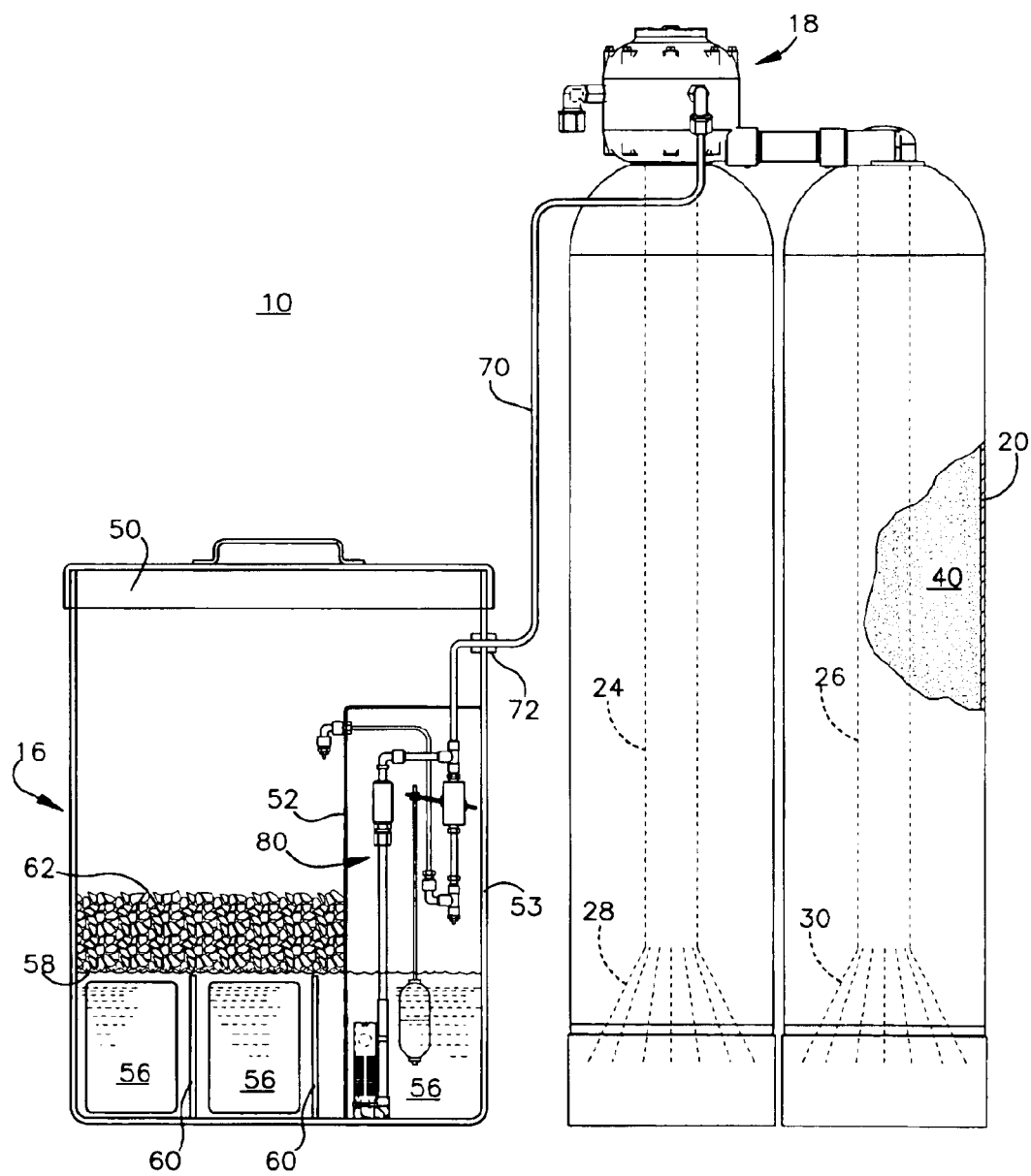
FIG. 1 is an elevational view, partially in cross-section, of a water softening apparatus incorporating the present invention.

Referring now to the drawings, and in particular FIG. 1, there is shown a water softening system, generally designated by reference numeral 10, that incorporates the present invention. The water softening system is designed to soften water when it is delivered to a residence or business. The system as shown, is advantageously designed and operated to prevent system failure as a result of brine crystallization. The system 10 includes two resin tanks 12, 14 proximally positioned near an upstanding brine tank 16 and a valve assembly 18 that is supported atop the tanks.

The valve assembly 18 is programmed to selectively maintain one of the tanks on-line with a household water supply system. The off-line tank is subjected to a regeneration cycle and then held off-line until the on-line tank is exhausted. The frequency with which the valve assembly 18 switches the tanks 12, 14 from on-line operation to regeneration is controlled by metering the usage of softened water or the like. The valve assembly 18 is operative to connect one of the tanks to the household water supply and also controls regeneration of an exhausted tank. The valve assembly maintains a regenerated tank "off-line" until the "on-line" tank becomes exhausted. Descriptions of the construction and operation of a control valves suitable for use in the present invention along with a complete description of a dual tank water softening system are described in U.S. Pat. No. 3,891,522 to Prior et al., and U.S. Pat. No. 4,298,025 to Prior et al., the disclosures of which are hereby incorporated by reference in its entirety.

The softener tanks 12, 14 are of known configuration and utilize common water softening chemicals. Each tank typically includes cylinders 20 of glass fiber construction. The upper ends of the cylinders 20 are threaded with female 2½ inch N.P.T. threads for connection to the valve assembly 18. Riser pipes 24, 26 depend centrally through the cylinders 20. A pair of screens 28, 30 communicate with the lower ends of the riser pipes 24, 26. Suitable ion exchange softening chemicals, indicated by reference numeral 40 are positioned in the cylinders 20, 22 surrounding the riser pipes 24, 26 and the screens 28, 30. Other resin tanks suitable for use in the present invention will be apparent to those skilled in the art in view of this disclosure. A complete description of the construction and operation of a resin tank suitable for use in the present invention can be found in U.S. Pat. No. 4,337,153 to Prior, the disclosure of which is hereby incorporated by reference.

The water softening process takes place as hard water passes through the tanks 12, 14. The water is channeled into the tanks 12, 14 and is softened during its passage downwardly through the ion exchange chemicals 40. Hard water is hereinafter defined as water that contains certain multivalent salts, such as those of calcium or magnesium, which can form insoluble deposits in boilers and precipitates with soap. The resin 40 in the tanks 12, 14 replaces or exchanges the hard ions in the source water with soft ions. Softened water then enters the risers pipes 24, 26 through the screens 28, 30 and is directed back out of the tanks 12, 14.

The brine tank 16 is an open ended cylindrical drum formed of suitable metal or plastic capped by a removable cover 50. The brine tank provides a brine supply system that utilizes common ion replacement salts to regenerate the softening chemicals 40. An upstanding brine well 52 is laterally positioned against a wall 53 in the brine tank 16. Those skilled in the art will recognize that the brine well could easily be positioned in other locations within the brine tank, e.g., centrally. The brine well is an open ended top tubular member formed from suitable metal or plastic. The lower region of the brine well 52 includes apertures 54 such that the brine solution from a brine reservoir 56 extends into the brine well wherein the level of solution in the well 52 is at about the same level contained in the reservoir 56.

A screen 58 extends horizontally from wall to wall in the brine tank and around the brine well 52. The screen is position about one-fourth of the way up the walls of the brine tank 16. The screen includes support members 60 of a fixed length for positioning the screen off the floor of the brine tank and for supporting the weight of a granular salt material disposed thereon. The granular salt material 62 is deposited in the brine tank 16 and rests atop the screen 58. The brine solution reservoir 56 is then defined below the screen 58. The reservoir communicates with the valve assembly 18 through a conduit 70, the fluid communication being controlled by a brine valve, generally designated by reference numeral 80.

The brine valve 80 is positioned in the brine well 52. The brine valve serves a dual function in that it controls both the outflow of brine solution from the reservoir 56 to the valve assembly 18 during tank regeneration and controls the inflow of water to replenish the brine solutions used during replenishment. Use of the brine control valve in accordance with the present invention prevents system failure caused by crystallization of salt in the brine. For example, crystals formed as a result of inactivity, temperature fluctuation, salt saturation or in any manner are prevented from causing system failure.

Figure 2:
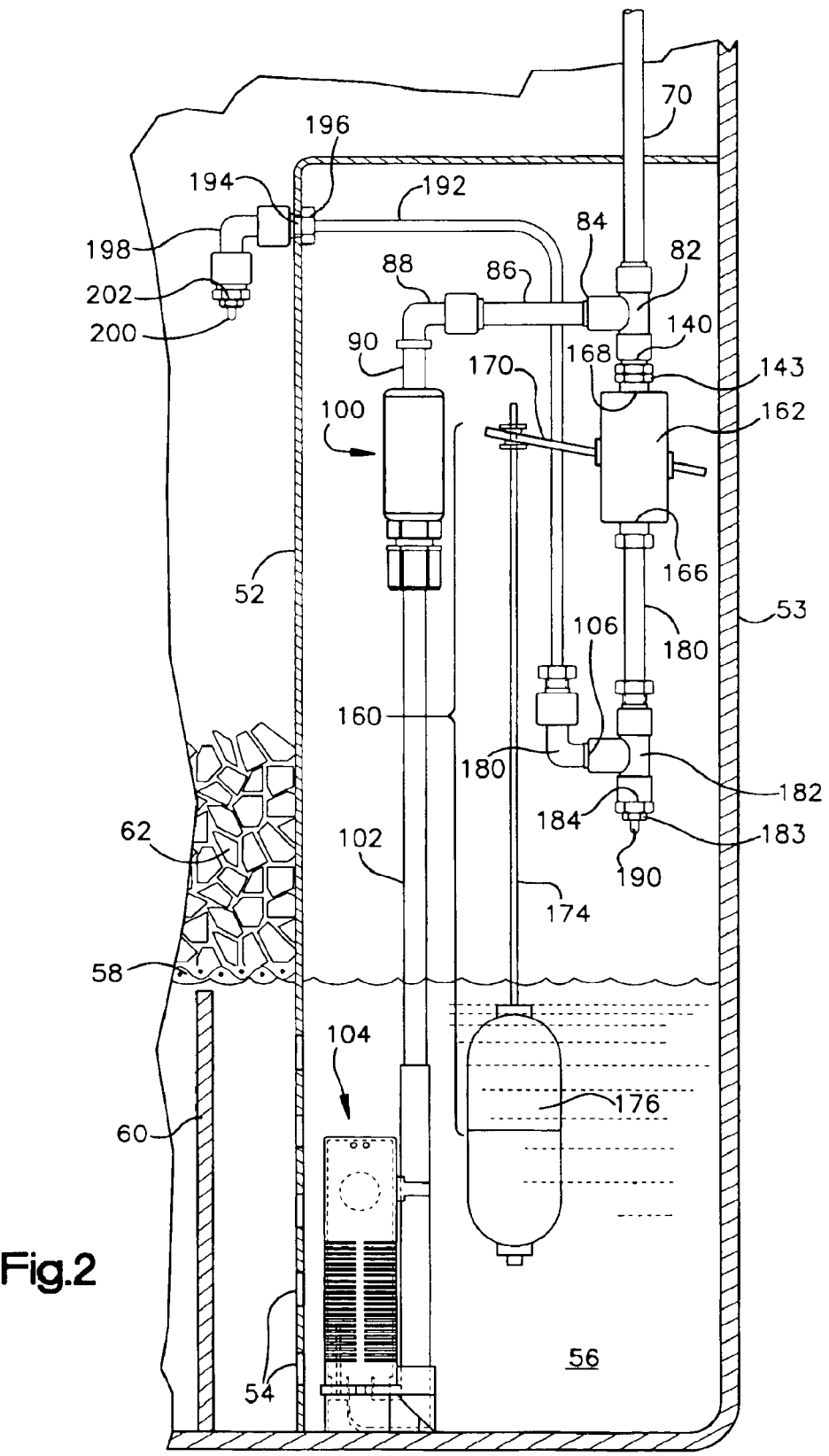
FIG. 2 is an exploded elevational view of the brine valve assembly constructed in accordance with the present invention.

Referring now to FIG. 2, there is shown an exploded side elevational view of the brine control valve 80 in the well 52. The brine control valve assembly 80 includes the brine conduit 70 that is connected to the valve assembly 18 via a port 72 in the wall of the tank 16 and provides passage of water during brine replenishment and also permits brine to be withdrawn during regeneration of the tanks 12, 14. Connected to conduit 70 is a tee 82. An opening 84 of tee 82 is connected to an assembly that is used to draw brine solution from the reservoir 56 to the tank 12 or 14 selected for resin regeneration. The tee opening 84 is laterally connected by conduit 86 to an elbow 88. The elbow 88 is further connected by conduit 90 to a check valve 100. A rigid tube 102 extends from the check valve 100 and is connected to an air check 104.

Referring now to FIG. 3, there is shown a cross sectional view of the check valve 100. The check valve 100 includes a cylindrical body 110 with upper and lower openings, 112, 114 respectively. The conduit 90 is connected to the upper opening 112 by conventional compression fittings 116. Located within the body 110 is a piston assembly that includes an umbrella check 116, a piston 118, a quad ring 120 and a spring 122. The umbrella check 116 is a flexible umbrella shaped silicone seal that is positioned in the body 110 as shown. As seen best in FIG. 3, the piston 118 includes a plurality of bores 118a. In the preferred embodiment, the piston 118 includes eight bores 118a each having a diameter of 0.027 inches. The umbrella check 116 allows fluid flow form the bores 118a into the conduit 90. However, flow from the conduit 90 into the bores 118a is substantially inhibited. An umbrella check valve 116 suitable for this application is available from Vernay Laboratories under the designation VL 2287-101. In the preferred embodiment, the seal 116 is formed from flouro silicone and has a durometer of 57.

The piston assembly functions to allow unidirectional passage of brine solution in the reservoir 56 through the air check 104 and then through conduits 102, 90, 86 and 70 during the regeneration cycle. During regeneration, the piston assembly decompresses the spring and the umbrella check unseats allowing passage of solution from the reservoir. It has been found that as long as the umbrella check unseats during regeneration, passage of brine will occur. The lower opening 114 is adapted to receive a compression fitting 124 for seating the piston assembly and for connecting to rigid tube 102. A screen, not shown, is optionally positioned within the fitting to prevent any particulate from passing through the assembly.

The air check assembly 104 includes a base portion 130 and a body portion 132. The base portion includes a fluid passageway 134 to the body portion and is connected to conduit 102. A tubular chamber 136 is disposed interiorly along a longitudinal axis of the body and is in communication with the passageway 134. A buoyant ball bearing 138 is disposed in the chamber 136. A series of horizontal slots 140 extend from an exterior surface of the body and are in communication with the chamber 136. The diameter of the passageway at the interface between the boy and base portions is of a smaller diameter than the diameter of the ball bearing thereby providing a seat 142 for the ball bearing 138 such that when the ball bearing makes contact with the seat the passage of solution is prevented. An example of a suitable air check valve for use in the present invention is Model No. FL500, commercially available from Fleck Controls, Inc.

In operation, the ball bearing 138 disposed in the chamber 136 floats in the brine solution in the reservoir 56. During tank regeneration, the valve assembly 18 causes a pressure change within the assembly that causes brine to be withdrawn from the reservoir. Once the level of the brine reservoir 56 is at about the height of the lowest horizontal slot 140, the ball bearing will become seated within the seat 142 of the chamber thereby preventing further passage of brine from being drawn. Once the ball bearing is seated, a slight vacuum on the ball bearing 136 prevents the ball bearing from being dislodged and as such, prevents further withdrawal of brine from the reservoir. After the selected tank, 12 or 14, is regenerated with brine, the valve assembly signals the system 10 to replenish the brine expended during regeneration.

During brine replenishment, the valve assembly 18 directs pressurized water into conduit 72 which causes a brief pulse of pressure to be exerted on the umbrella check 116 of the check valve 100. The umbrella check seats and causes the piston assembly to move downward compressing the spring and exerting a counter-pressure of a small volume of solution in conduit 102. Consequently, the solution in conduit 102 pulses through the air check assembly 104, thereby releasing the vacuum on the ball bearing 136 in seat 142. Once the vacuum is removed, the ball bearing 136 is free to float in the chamber. As such, the ball bearing 136 will rise to the height of the brine solution in the reservoir 56 as it is being replenished or to the ceiling in the air check chamber depending on the height of the reservoir. The actual brine replenishment will be discussed in greater detail below. The Applicants have found that without the back pulse provided by the check valve, the water treatment system would lock up during subsequent regeneration cycles. For example, simple ball check valves have been found to be inadequate and prone to hydraulic failure during multiple regeneration cycles.

The brine replenishment system is connected to the other opening 140 of tee 82. The brine replenishing assembly includes a rod and float assembly. The rod and float assembly, which will be described in detail below, is connected to the tee opening by means of an adapter 143 having a threaded end portion and a stem portion The stem portion is conventionally connected to the tee 82. Preferably, a metal screen (not shown) is inserted in the tee prior to attaching the stem to the tee. A press-in check valve (not shown) is inserted into the threaded end of the adapter 143. The threaded end of the adapter 143 is then connected to the rod and float assembly. A suitable press-in check valve is available from Flomatic Systems, Inc. and has a designation of RC-256.

The rod and float assembly 160 includes a refill valve 162. The refill valve includes a cylindrical body 164 with a lower opening 166 and an upper opening 168. A rod 170 extends through openings in the sidewall of the body and controls the opening and closing of a valve body (not shown) disposed in the refill valve. The rod 170 is pivotally attached to a rigid tube 174 wherein the distal end of the tube includes a buoyant float 176. As the height of the reservoir 56 changes during regeneration cycles, the float 176 causes the rod 170 to move the valve body 172 upwardly or downwardly in the body thereby opening or closing the refill valve depending on the height of brine solution in the reservoir 56. For example, if the brine reservoir is low, the float and the corresponding angle of the rod will cause the valve body to rise and provide passage of water thereby permitting replenishment of the brine. In contrast, as the brine reservoir is replenished, the valve body lowers and slowly closes the passageway, whereby passage of water is prevented. The predetermined height of the rigid tube 124 and the float 176 are factors that control the amount of brine to be replenished.

The lower opening 166 of the refill valve is connected to a dual nozzle assembly by means of conduit 180. The dual nozzle assembly includes a first spray nozzle 190 that is positioned to release water in the brine well and a second spray nozzle 200 that is positioned to release water directly onto the granular salt bed. The conduit 180 is connected to tee 182. A threaded reducer bushing 183 is connected to the one opening of the tee 184. The first spray nozzle 190 is connected to the bushing 183 and as such, is positioned to spray water during brine replenishment cycles within the brine well 52. An elbow 188 is connected to an other opening 186 of tee 182. A flexible conduit 192 is connected to the elbow 188 and extends to a port 194 in the brine well 52. The port 194 is located above height of the granular salt material 62. The conduit 192 is connected to a connector 196 and elbow 198 that are secured to the port 194 in the brine well wall. A threaded reducer bushing 202 is attached to the elbow. The second spray nozzle 200 is threaded into the bushing 202 and is positioned to release spray directly onto the granular salt 62. Spray nozzles suitable for this application are available from Hago Manufacturing Company, Incorporated.

During the time when brine is being drawn from the reservoir, the press-in check valve (not shown) located within the fitting 143 inhibits the flow of air into the brine conduit 70 via the nozzles 190, 200.

The flow rates of each individual nozzle 190, 200 are preferably controlled wherein a flow ratio at the second nozzle 200 compared to the first nozzle 190 is from about 4:1 to about 8:1. More preferably, the flow ratios are at about 6:1. The first nozzle 190 sprays pressurized water directly into the brine well 52 and as such, dilutes the residual brine in the reservoir with water and/or dissolves any salt crystals formed. Simultaneously, the second nozzle 200 sprays water over the granular salt 62 to replenish the brine reservoir 56 to a level determined by positioning of the rod and float assembly 160. Since the water from the spray material must first pass through the granular salt material 62, it is believed that the water from the first nozzle preferentially dilutes the brine reservoir to ensure that the solution is definitely lower in saturation. The Applicants have found the preferred ratio of flow rates of each nozzle are important to maintain a target concentration of brine in the reservoir and be effective in preventing recrystallization. The aforementioned range of flow rates have been found to be effective for preventing system failure as a result of salt formation in the reservoir.

The granular salt material 62 preferably includes soft ion donors including, but not limited to, salts such as potassium chloride and sodium chloride. Other salts suitable for use in water softening systems will be apparent to those skilled in the art in view of this disclosure. The use of the dual nozzle assembly with the aforementioned flow rates dilutes and/or dissolves the brine reservoir during the brine replenishment cycle prior to or simultaneous with brine replenishment. The present invention is especially advantageous with those softening salts that exhibit solubility differences over a range of temperatures, e.g., potassium chloride.

Many modifications and variations of the invention will be apparent to those skilled in the art in light of the foregoing disclosure. Therefore, it is to be understood that, within the scope of the appended claims, the invention can be practiced otherwise than has been specifically shown and described.

We claim:

1. A brine valve mechanism which controls the supply of brine to a water treatment tank comprising:
    a) a conduit in communication with the treatment tank;
    b) means for withdrawing brine from a brine reservoir within a brine tank containing brine comprising a passageway in communication with the brine and a passageway in communication with the conduit; and
    c) means for supplying water to the brine tank wherein the brine tank includes a brine well in communication with a brine reservoir, the means for supplying water comprising a first nozzle and a second nozzle in communication with a supply of water, the first nozzle supplying water to the brine well for diluting the brine in the reservoir, the second nozzle supplying water to a salt material disposed over the reservoir for replenishing brine in the brine reservoir, the ratio of a flow of water from the second nozzle to the first nozzle is at about 6:1.

2. The mechanism of claim 1 wherein said means for withdrawing brine from a reservoir is an apparatus for producing a fluid pulse in a conduit, comprising:
    a) structure defining a chamber slidably supporting a piston;
    b) a biasing element for urging said piston towards a first position;
    c) said piston including at least one piston passage for allowing fluid flow from a first fluid passage to a second fluid passage;
    d) a check valve carried by said piston for controlling fluid flow through said piston passage, such that fluid flow from said first fluid passage to said second fluid passage is permitted by said check valve; and,
    e) said check valve inhibiting fluid flow from said second fluid passage through said piston passage, such that fluid flow out of said second fluid passage exerts a force on said piston causing said piston to move away from its first position and producing a fluid pressure pulse in said first fluid passage.

3. The mechanism of claim 2, wherein said first fluid passage communicates with a check valve which is opened in response to said fluid pressure pulse.

4. The mechanism of claim 3, wherein said apparatus operates to unseat a ball check valve that controls the communication of brine solution from a reservoir into a brine supply conduit.

5. A brine valve mechanism which controls the supply of brine to a water treatment tank comprising:
    a) a first conduit in communication with the treatment tank;
    b) means for withdrawing brine from a reservoir in communication with the first conduit wherein the means for withdrawing brine comprises a one way valve, an air check immersed in a volume of brine, and a second conduit connected to the valve and the air check such that there is a fluid passageway with the water treatment tank, the valve comprising a flexible membrane, a piston and a spring operatively connected wherein a supply of water causes the flexible membrane to flex and exert a pressure pulse on a volume of liquid in the second conduit whereby the volume of liquid displaces a float from a seat in the air check; and
    c) means for supplying water to the brine tank wherein the brine tank includes a brine well in communication with a brine reservoir, the means for supplying water comprising a first nozzle and a second nozzle in communication with the supply of water, the first nozzle supplying water to the brine well for diluting the brine in the reservoir, the second nozzle supplying water to a salt material disposed over the reservoir for replenishing brine in the reservoir, the ratio of a flow of water from the second nozzle to the first nozzle is at about 6:1.

6. A brine valve mechanism which controls the supply of brine to a water treatment tank comprising:
    a) a conduit in communication with the treatment tank;
    b) an apparatus in communication with the conduit for withdrawing brine from a brine reservoir within a brine tank comprising:
        i) structure defining a chamber slidably supporting a piston;
        ii) a biasing element for urging said piston towards a first position;
        iv) said piston including at least one piston passage for allowing fluid flow from a first fluid passage to a second fluid passage;
        v) a check valve carried by said piston for controlling fluid flow through said piston passage, such that fluid flow from said first fluid passage to said second fluid passage is permitted by said check valve; and,
        vi) said check valve inhibiting fluid flow from said second fluid passage through said piston passage, such that fluid flow out of said second fluid passage exerts a force on said piston causing said piston to move away from its first position and producing a fluid pressure pulse in said first fluid passage;

c) a first nozzle for supplying water to a brine well within the brine tank and wherein the brine well is in communication with the brine reservoir, and d) a second nozzle in communication with a supply of water, wherein the first nozzle supplies water to the brine well for diluting the brine in the reservoir and the second nozzle supplies water to a salt material disposed over the reservoir for replenishing brine in the reservoir, the ratio of a flow of water from the second nozzle to the first nozzle is about 6:1.

7. The mechanism of claim 6, wherein said first fluid passage communicates with a check valve which is opened in response to said fluid pressure pulse.

8. The mechanism of claim 6, wherein said apparatus operates to unseat a ball check valve that controls the communication of brine solution from a reservoir into a brine supply conduit.

* * * * *